United States Patent
Paczkowski et al.

(10) Patent No.: US 9,172,580 B1
(45) Date of Patent: Oct. 27, 2015

(54) SELECTING TRANSCEIVER FOR WIRELESS NETWORK BASED ON SECURITY KEYS

(71) Applicant: Sprint Communications Company L.P., Overland Park, KS (US)

(72) Inventors: Lyle Walter Paczkowski, Mission Hills, KS (US); Geoffrey S. Martin, Overland Park, KS (US); Warren B. Cope, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 225 days.

(21) Appl. No.: 13/962,439

(22) Filed: Aug. 8, 2013

(51) Int. Cl.
*H04L 29/06* (2006.01)
*H04W 12/04* (2009.01)

(52) U.S. Cl.
CPC ......... *H04L 29/06163* (2013.01); *H04W 12/04* (2013.01)

(58) Field of Classification Search
CPC ... H04L 65/103; H04L 63/18; H04L 63/0853; H04L 63/0876; H04L 69/24; H04L 69/14; H04L 29/06129; H04L 29/06163
See application file for complete search history.

(56) References Cited

U.S. PATENT DOCUMENTS

| 2009/0191858 | A1  | 7/2009 | Calisti et al. |
| 2009/0217038 | A1* | 8/2009 | Lehtovirta et al. ............ 713/168 |
| 2012/0238245 | A1* | 9/2012 | Brusilovsky et al. ......... 455/411 |

FOREIGN PATENT DOCUMENTS

| EP | 2018742 | 11/2007 |
| WO | 2007134468 | 11/2007 |

* cited by examiner

*Primary Examiner* — Eleni Shiferaw
*Assistant Examiner* — Paul Callahan

(57) ABSTRACT

Systems, methods, and software for operating communication systems and wireless communication devices are provided herein. In one example, a method is provided that includes transferring an access request for delivery to a remote data system, receiving a security challenge transferred by the remote data system, and in response, transferring a security answer for delivery to the remote data system that includes at least one hash result generated in the security portion using at least one of the security keys. The method also includes receiving a security grant transferred by the remote data system indicating one of the hash results, selecting at least one of the transceivers based on an association of the transceivers with one of the security keys used to generate the hash result indicated in the security grant, and transferring the data for delivery to the remote data system over a wireless network associated with the selected transceiver.

20 Claims, 5 Drawing Sheets

US 9,172,580 B1

SELECTING TRANSCEIVER FOR WIRELESS NETWORK BASED ON SECURITY KEYS

TECHNICAL FIELD

Aspects of the disclosure are related to the field of communication systems, and in particular, selecting transceivers in wireless communication devices based on security keys.

TECHNICAL BACKGROUND

Wireless communication systems typically include wireless access systems with equipment such as wireless access nodes along with various control and routing nodes which provide wireless access to communication services for wireless communication devices over wireless links. A typical wireless communication system includes systems to provide wireless access across a geographic region, with wireless coverage areas associated with individual wireless access nodes. The wireless access systems exchange user communications between wireless communication devices, service providers, and other end user devices. The user communications typically include voice calls, data exchange, web pages, streaming media, or text messages, among other communication services.

In some wireless communication systems, more than one wireless communication network can be employed across a similar geographic region, with each wireless communication network including one or more sectors of wireless coverage. For example, a first wireless network employing a first wireless communication protocol can be deployed along with a second wireless network employing a second wireless communication protocol. Separate wireless access equipment can be deployed for each wireless network, such as when a fourth generation (4G) Long Term Evolution (LTE) wireless network is deployed over a similar geographic area as a third generation (3G) wireless network or other wireless networks.

Wireless communication devices can be configured to support multiple wireless access modes, such as communicating with one or more wireless networks using one or more transceivers or associated equipment. However, selecting which wireless access mode, protocol, or transceiver to use for any given communication session can be complicated due to loading conditions, network preferences, RF conditions, or security concerns.

In addition to multiple transceiver portions, some wireless communication devices include partitioned security 'zones' in their associated processing systems. For example, a first zone can be employed to execute open or untrusted applications and obtain untrusted or unauthenticated data, and a second zone can be employed to execute trusted applications or obtain authenticated data. These security zones can be implemented on separate microprocessors, in separate cores of a multi-core microprocessor, or otherwise allocated over different processing portions of a computing or sensor device. However, when multiple transceivers are employed on a device with these security zones, indicating which transceiver to use or authenticating data from a specific transceiver can be difficult due to the various security zone measures.

OVERVIEW

Systems, methods, and software for operating wireless communication devices and communication systems are provided herein. In one example, a method of operating a wireless communication device comprising a security portion that stores a plurality of security keys and a communication portion comprising a plurality of transceivers for communicating over one or more wireless networks is provided. The method includes, in the communication portion, transferring an access request for delivery to a remote data system responsive to data for transfer to the remote data system, receiving a security challenge transferred by the remote data system, and in response, transferring a security answer for delivery to the remote data system that includes at least one hash result generated in the security portion using at least one of the security keys. The method also includes, in the communication portion, receiving a security grant transferred by the remote data system indicating one of the hash results, selecting at least one of the transceivers based on an association of the transceivers with one of the security keys used to generate the hash result indicated in the security grant, and transferring the data for delivery to the remote data system over a wireless network associated with the selected transceiver.

In another example, a wireless communication device is provided. The wireless communication device includes a security portion that stores a plurality of security keys, and a communication portion comprising a plurality of transceivers for communicating over one or more wireless networks. The communication portion is configured to transfer an access request for delivery to a remote data system responsive to data for transfer to the remote data system, receive a security challenge transferred by the remote data system, and in response, transfer a security answer for delivery to the remote data system that includes at least one hash result generated in the security portion using at least one of the security keys. The communication portion is configured to receive security grant transferred by the remote data system indicating one of the hash results, select at least one of the transceivers based on an association of the transceivers with one of the security keys used to generate the hash result indicated in the security grant, and transfer the data for delivery to the remote data system over a wireless network associated with the selected transceiver.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Figure 1:
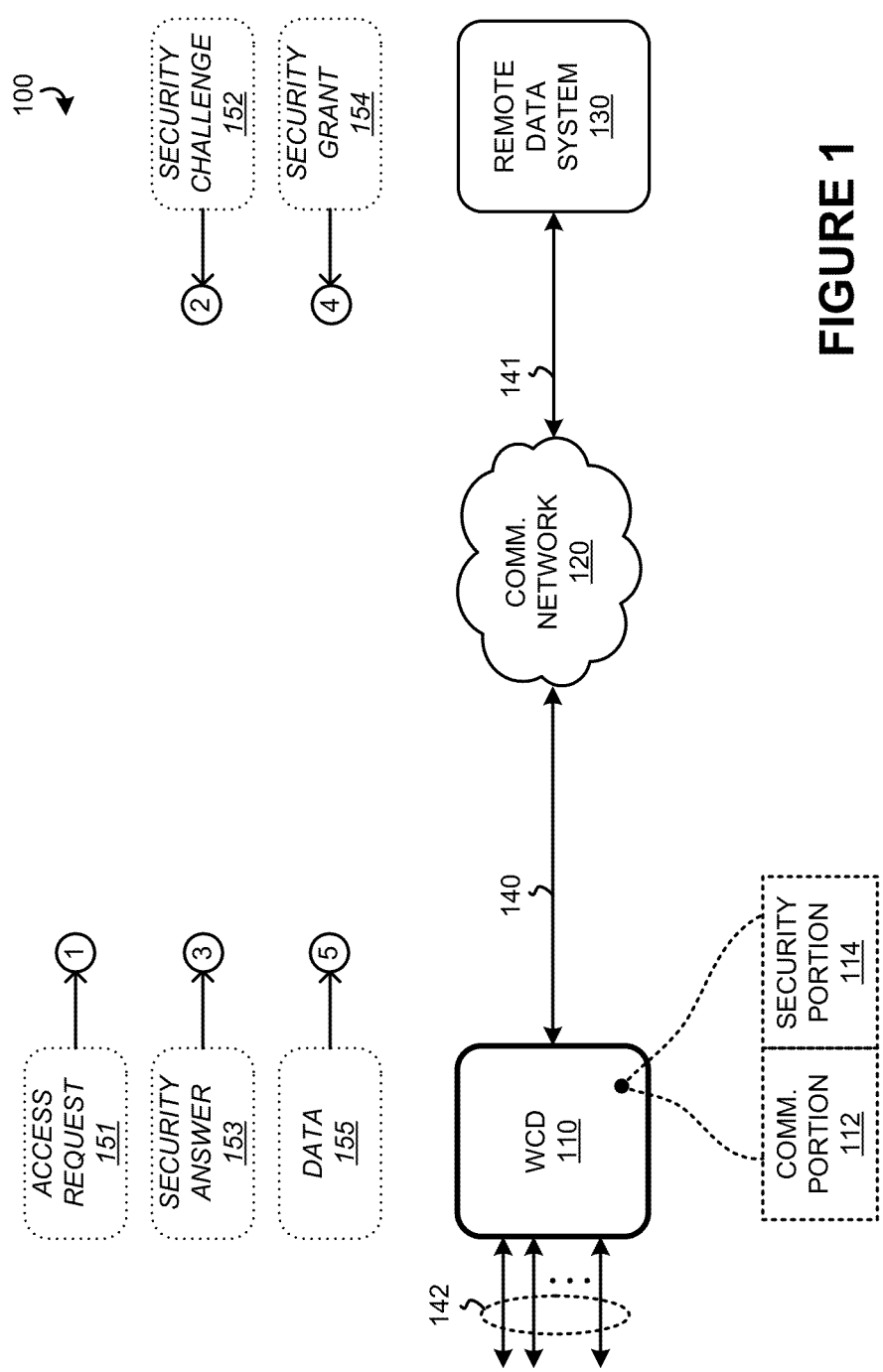
FIG. 1 is a system diagram illustrating a communication system.

FIG. 1 is a system diagram illustrating communication system 100. Communication system 100 includes wireless communication device (WCD) 110, communication network 120, and remote data system 130. WCD 110 and communication network 120 communicate over communication link 140. Communication network 120 and remote data system 130 communicate over communication link 141. WCD 110 includes communication portion 112 communicatively coupled to security portion 114. Communication portion 112 comprises one or more transceivers, and security portion 114 stores one or more security keys.

In operation, WCD 110 includes one or more transceivers which can communicate over one or more wireless or wired communication links. However, WCD 110 might not know which transceiver to use for transferring data or other communications. Furthermore, WCD 110 authenticates with remote data system 130 before any associated transceiver can be trusted. In this example, both transceiver selection and authentication of the transceiver can be achieved, among other operations. WCD 110 includes one or more security keys, and stores these security keys in storage media associated with security portion 114. These security keys can be employed in authenticating and selecting various transceivers of WCD 110.

As shown in FIG. 1, when data is needed to be transferred to remote data system 130, then access request 151 is transferred for delivery to remote data system 130. Security challenge 152 is transferred by remote data system 130 for delivery to WCD 110, and WCD 110 responsively transfers security answer 153 for delivery to remote data system 130. If security answer 153 includes sufficient security information, then security grant 154 is issued by remote data system 130. Data 155 is then transferred by WCD 110 using a selected transceiver.

Figure 2:
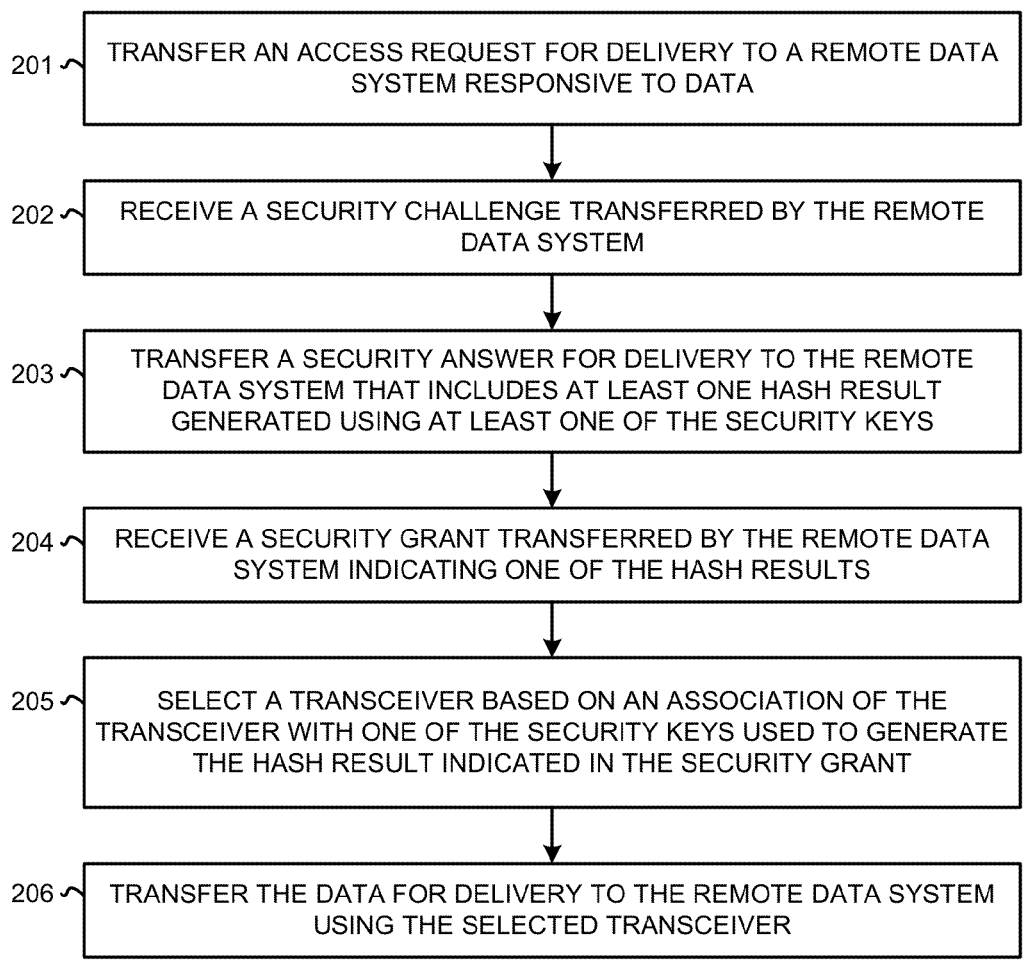
FIG. 2 is a flow diagram illustrating a method of operation of a wireless communication device.

FIG. 2 is presented to illustrate another example operation of the elements of FIG. 1. FIG. 2 is a flow diagram illustrating a method of operation of WCD 110. The operations of FIG. 2 are referenced below parenthetically. As discussed above, WCD 110 includes communication portion 112 which comprises one or more transceivers, and security portion 114 which stores one or more security keys.

In FIG. 2, WCD 110 transfers (202) an access request for delivery to remote data system 130 responsive to data for transfer. In this example, access request 151 is transferred by communication portion 112 of WCD 110 over link 140. Access request 151 can include a request for initiating communication with remote data system 130, such as an indication that a data transfer condition has been met and a request to transfer data associated with the transfer condition.

Responsive to access request 151, WCD 110 receives (202) a security challenge transferred by remote data system 130. In this example, remote data system 130 transfers security challenge 152 for delivery to WCD 110 over link 141. Security challenge 152 can include a request for one or more hash results, security keys, passwords, usernames, or device identifiers, among other security and identification information. In some examples, security challenge 152 includes data or information which is to be processed using a security key or security keys included in WCD 110. For example, security challenge 152 can include seed data that is to be encoded or encrypted using the security keys stored in WCD 110.

WCD 110 transfers (203) a security answer for delivery to remote data system 130 that includes at least one hash result generated using at least one of the security keys stored in WCD 110. Security answer 153 is transferred by WCD 110 over link 140. The security keys can be encryption keys, pseudorandom keys, private keys, or other security keys. Each security key stored in WCD 110 can be processed to determine a hash result or other encryption result, possibly using seed data. This hash result for one or more of the security keys is transferred in security answer 153. Security portion 114 can store the security keys in a non-transitory computer readable medium.

In some examples, all of the security keys are processed to identify a hash result for each security key. Other information, such as the seed data described above, can be used in processing the hash result. In other examples, a subset of the security keys is processed to identify associated hash results. Which ones of the security keys or hash results to include in security answer 153 can be determined by WCD 110 based on factors monitored by WCD 110. For example, when many transceiver portions are included in WCD 110, different trigger conditions or properties of the data can be associated with each transceiver portion, and these can be used to determine which security key to process and identify a hash result. Other information can be included in security answer 153, such as indications for one or more trigger conditions that were satisfied, or properties of the data, such as data size.

WCD 110 receives (204) a security grant transferred by remote data system 130 indicating at least one of the hash results. In this example, security grant 154 is transferred by remote data system 130 over link 141. Remote data system 130 identifies at least one of the hash results transferred in security answer 153 as a granted hash result. This grant condition can be based on determining that the hash result is correct or corresponds to a proper security hash result, such as by determining a successful security handshaking using the hash result. The grant condition can also occur when the hash result is decrypted or decoded and corresponds to seed data or other information. In other examples, one or more hash results are selected from several hash results, and the selected hash result or results are indicated in security grant 154. The selected hash results indicated in security grant 154 can correspond to one or more transceivers in WCD 110 indicated by remote data system 130. These selected hash results in security grant 154 can be selected to indicate a preferred transceiver of WCD 110 based on network conditions, authorized transceivers of WCD 110, or a data transfer condition which originally prompted access request 151.

WCD 110 selects (205) one or more of the transceivers based on an association of the transceivers with one of the security keys used to generate the hash result indicated in the security grant. In this example, communication portion 112 can include more than one transceiver, and each transceiver can be associated with one or more security keys. The selected hash result indicated in security grant 154 corresponds to the security key originally used to generate the hash result. The security key can likewise be associated with a particular transceiver, or more than one transceiver.

WCD 110 transfers (206) the data for delivery to remote data system 130 using the selected transceiver. In this example, the data is transferred by communication portion 112 over link 140. In some examples, the data is also encrypted or encoded using the security key used to generate the hash result indicated in security grant 154.

Figure 3:
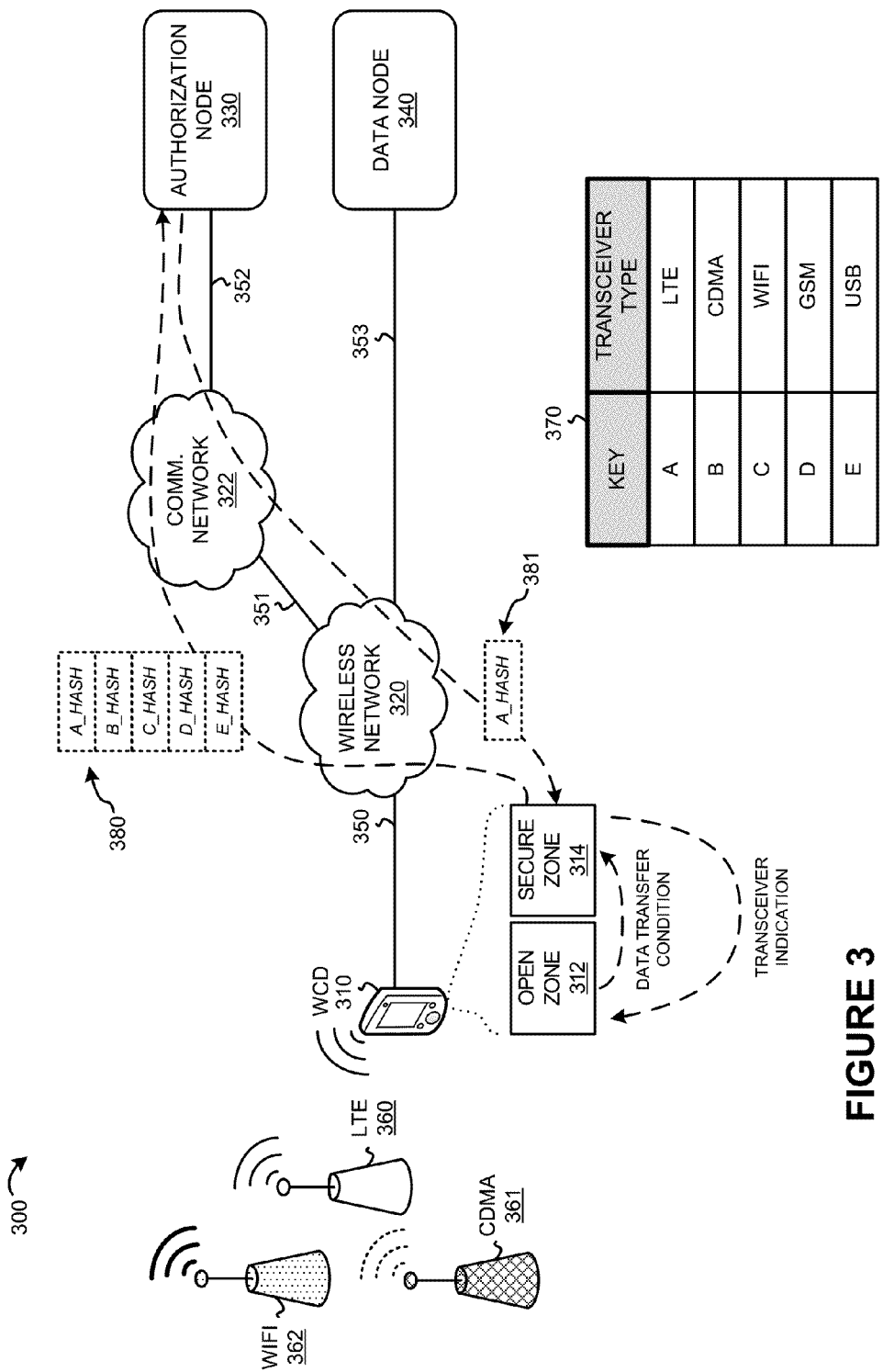
FIG. 3 is a system diagram illustrating a communication system.

As another example of a wireless communication device and associated communication and data nodes, FIG. 3 is presented. FIG. 3 is a system diagram illustrating communication system 300. Communication system 300 includes wireless communication device (WCD) 310, wireless network 320, communication network 322, authorization node 330, and data node 340. FIG. 3 also includes table 370 which indicates associations between transceiver types and security keys. WCD 310 and wireless network 320 communicate over wireless link 350, which is a cellular voice and data link in this example. Wireless network 320 and communication network 322 communicate over link 351, which is an optical networking link in this example. Authorization node 330 and communication network 322 communicate over link 352, which is an Ethernet communication link in this example. Data node 340 and wireless network 320 communicate over link 352, which is an Internet protocol (IP) link in this example.

WCD 310 includes a plurality of transceiver portions, each transceiver portion associated with a different wireless communication protocol. In this example, at least 5 transceiver portions or transceiver types are included in WCD 310, namely a Long Term Evolution (LTE) transceiver portion, a Code Division Multiple Access (CDMA) transceiver portion, an IEEE 802.11 WiFi transceiver portion, a Global System for Mobile Communications (GSM) transceiver portion, and a Universal Serial Bus (USB) transceiver portion. It should be understood that any number and type of transceiver portion or transceiver type can be included in WCD 310, including wired, wireless, optical, and other transceiver types using any associated communication protocol, frequencies, spectrum, and the like.

WCD 310 also is comprised of open zone 312 and secure zone 314. Each zone of WCD 310 can be implemented in a separate microprocessor, microprocessor core, system on a chip, virtual core, or other hardware or software partition that separates memory spaces, operating systems, drivers, and other operational hardware and software elements so as to provide a restricted level of access for applications and users to secure zone 314, and a non-restricted level of access for open zone 312. In some examples, open zone 312 comprises a standard core of a processor system, such as for operating an Android, Windows, iOS, or other user-accessible operating system. Likewise, secure zone 314 comprises in some examples, a secure core or "trust zone" core of a processor system which prevents access to the processing and memory elements of secure zone 314 unless authorized through a security exchange or security handshake with authorization node 330.

This partitioned configuration of secure zone 314 differs from user-level password protected access, in that any application that desires to execute on secure zone 314 must first be authorized by a security handshaking process with authorization node 330. Whereas open zone 312 might run applications after a user merely "logs in" or passes a user-level security access, and the applications executed on open zone 312 are not authorized through a security handshaking process with authorization node 330. In some examples, such as found in FIG. 1, a communication portion (such as communication portion 112) is located in open zone 312, while a security portion (such as security portion 114) is located in secure zone 314. It should be understood that these partitions can be varied.

Communication networks 320 and 322 each comprise wired and wireless network equipment for routing communications between various endpoints and over various communication links. In this example, wireless network 320 comprises a cellular voice and data network comprising one or more wireless access nodes distributed over a geographic area, while communication network 322 comprises an IP network including one or more routing nodes. Communication networks 320 and 322 can include elements described for communication network 120 in FIG. 1.

Authorization node 330 and data node 340 can each include communication or network interfaces, as well as computer systems, microprocessors, circuitry, cloud-based systems, or some other processing devices or software systems, and can be distributed among multiple processing devices. Examples of authorization node 330 and data node 340 can also each include software such as an operating system, logs, databases, utilities, drivers, networking software, and other software stored on a computer-readable medium. Authorization node 330 and data node 340 can include elements described for remote data system 130 of FIG. 1. It should be noted that in some examples, data node 340 is included in authorization node 330.

Wireless access nodes 360-362 are each associated with a different wireless network that WCD 310 can communicate with over an associated wireless link. In FIG. 3, wireless access node 360 corresponds to a Long Term Evolution (LTE) cellular voice and data network, wireless access node 361 corresponds to a Code Division Multiple Access (CDMA) cellular voice and data network, and wireless access node 362 corresponds to an IEEE 802.11 WiFi access point, such as for a home or office data network. It should be understood that other data networks and access points can be employed, and that wireless network 320 can incorporate ones of wireless access nodes 360-362. Additionally, WCD 310 can include a Universal Serial Bus (USB) or other wired transceivers, such as Ethernet, which can communicate with other systems and networks which are not shown in FIG. 3 for clarity.

Figure 4:
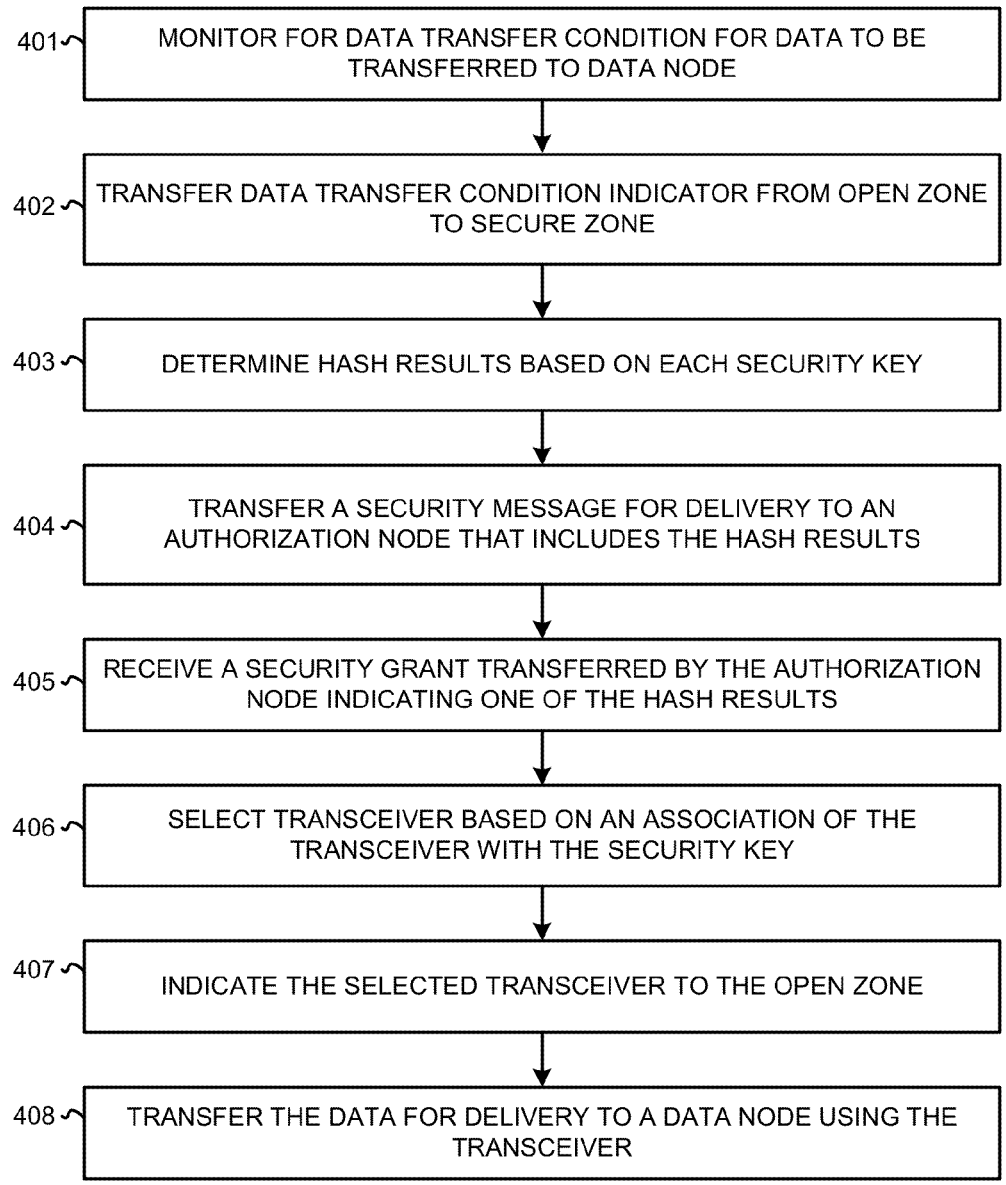
FIG. 4 is a flow diagram illustrating a method of operation of a communication system.

As an example operation of the elements of system 300, FIG. 4 is provided. FIG. 4 is a flow diagram illustrating a method of operation of communication system 300. The operations of FIG. 4 are referenced below parenthetically. In FIG. 4, WCD 310 monitors (401) for a data transfer condition for data to be transferred to a data node. In this example, the data transfer condition can be triggered based on data received through a user interface of WCD 310, data received through a sensor portion of WCD 310, data ready for transfer through a periodic transfer in an application of WCD 310, among other data transfer conditions. Responsive to a data transfer condition being satisfied, WCD 310 transfers (402) an indication of the data transfer condition from open zone 312 to secure zone 314. The indication can include a flag or logical message that indicates to secure zone 314 that data is ready for transfer. In some examples, the data transfer condition is monitored by secure zone 314, and an indication is not transferred from open zone 312 to secure zone 314.

Responsive to the data transfer condition, secure zone 314 of WCD 310 determines (403) hash results based on security keys stored in secure zone 314. As shown in table 370 of FIG. 3, each security key can be associated with one or more transceiver types. In table 370, an LTE transceiver type is associated with security key A, a CDMA transceiver type is associated with security key B, a WiFi transceiver type is associated with security key C, a GSM transceiver type is associated with security key D, and a USB transceiver type is associated with security type E. Secure zone 314 correlates these transceiver types to security keys in a data structure, such as listed in table 370. The hash results can be determined based on a cryptographic hash function. For example, a security key can be processed by a cryptographic hash function such as secure hash algorithm (SHA) or message digest algorithm (MD) to determine a cryptographic hash result which is used as the hash result discussed here. Hash results are determined for each security key.

WCD 310 transfers (404) a security message for delivery to authorization node 330 that includes the hash results. In FIG. 3, security message 380 includes hash results which can include any hash result associated with security keys A-E. Security message 380 is transferred over link 350 for delivery to authorization node 330.

Secure zone 314 of WCD 310 receives (405) a security grant message transferred by authorization node 330 indicating one of the hash results. In this example, authorization node 330 transfers security grant message 381 over link 352 for delivery to WCD 310. Security grant message 381 indicates A_HASH as the selected hash result, as shown in FIG. 3. Authorization node 330 can select one or more of the hash results provided in security message 380 based on various factors.

One factor can be that the hash results correspond to a correct or verified hash result, such as when a hash result might be tampered with or altered by an unauthorized system or user. Other factors can include selecting a particular transceiver portion from among many verified hash results. The particular transceiver can be selected based on a RF conditions measured by WCD 310 and provided to authorization node 330 in security message 380. The particular transceiver can be selected based on an amount of data to be transferred, such that a higher bandwidth transceiver portion can be selected when the data to be transferred exceeds a size threshold. The particular transceiver can be selected based on whether a user of WCD 310 is authorized to use a particular transceiver portion, such as when a user has not paid for use of a certain wireless network type, but has paid for use of another wireless network type. Other considerations can be employed by authorization node 330, including combinations thereof.

WCD 310 selects (406) transceiver portion of WCD 310 based on an association of the transceiver portion with the security key. In this example, security key A is indicated with the successful hash result, and as per the relationship indicated in table 370, security key A relates to an LTE wireless transceiver. Thus, WCD 310 selects the LTE transceiver of WCD 310 based on successful authorization of security key A. It should be understood that more than one transceiver can be associated with each security key in table 370.

Secure zone 314 of WCD 310 indicates (407) selected transceiver to open zone 312. Since the actual security key is not indicated in security grant message 381 in this example, secure zone 314 translates the hash result indicated in security grant message 381 into the associated security key and selects a transceiver accordingly. This selected transceiver is then indicated to open zone 312. It should be understood that more than one hash result can be indicated in security grant message 381, and thus more than one transceiver portion can be indicated to open zone 312.

WCD 310 transfers (408) the data for delivery to data node 340 using the selected transceiver. Data node 340 can collect data associated with WCD 310, among other devices. In examples where more than one transceiver is indicated to open zone 312, then open zone 312 can select any of the indicated transceivers. In some examples, a further selection process is performed by open zone 312 or secure zone 314 to select among multiple transceivers based on signal conditions, amount of data to be transferred, proximity to an access point, among other considerations. In further examples, a user of WCD 310 is prompted to select among the authorized or indicated transceivers if more than one is indicated by security grant 381.

In further examples, the data transfer condition is prompted by one or more sensor portions of WCD 310, which monitor one or more environmental conditions to detect a trigger condition. These trigger conditions can include geographic location triggers, atmospheric trigger conditions, and RF status trigger conditions, among other trigger conditions. Responsive to the environmental or other trigger condition being satisfied, WCD 310 can determine that the data transfer condition exists. The trigger conditions can be monitored by sensor portions of WCD 310 which can include ones of a gas concentration sensor, a temperature sensor, a pressure sensor, a humidity sensor, a geographic location sensor, an acceleration sensor, and a seismic sensor, among other sensor portions.

A geographic location trigger can include a threshold condition based on a geographic location of WCD 310, which can be determined by a Global Positioning System (GPS) sensor of WCD 310, trilateration with wireless access nodes, or other positioning sensors or systems. Geographic trigger conditions can be satisfied due to movement of WCD 310 which brings WCD 310 into a particular geographic area, region location, or other geographic area or position. Atmospheric trigger conditions include a threshold condition based on atmospheric conditions detected by WCD 310, such as by an atmospheric pressure sensor, temperature sensor, humidity sensor, wind sensor, or other atmospheric sensor portions of WCD 310. Atmospheric trigger conditions can be satisfied due to atmospheric conditions monitored by WCD 310 satisfying one or more thresholds associated with each sensor. RF status trigger conditions include a threshold condition based on RF signal conditions detected by WCD 310, such as by RF signal strength, signal-to-noise ratios, or other metrics of signal strength associated with RF signals of WCD 310. These RF signals can be associated with one or more wireless access nodes of wireless network 320 or access point 360-362. RF status trigger conditions can also be associated with a signal property of link 350, which can be a wired link or a wireless link. RF status trigger can be satisfied due to RF signal conditions monitored by WCD 310 satisfying one or more RF signal thresholds. Each sensor or trigger condition can correspond to the data, such as sensor data, indicated above for transfer to data node 340.

Figure 5:
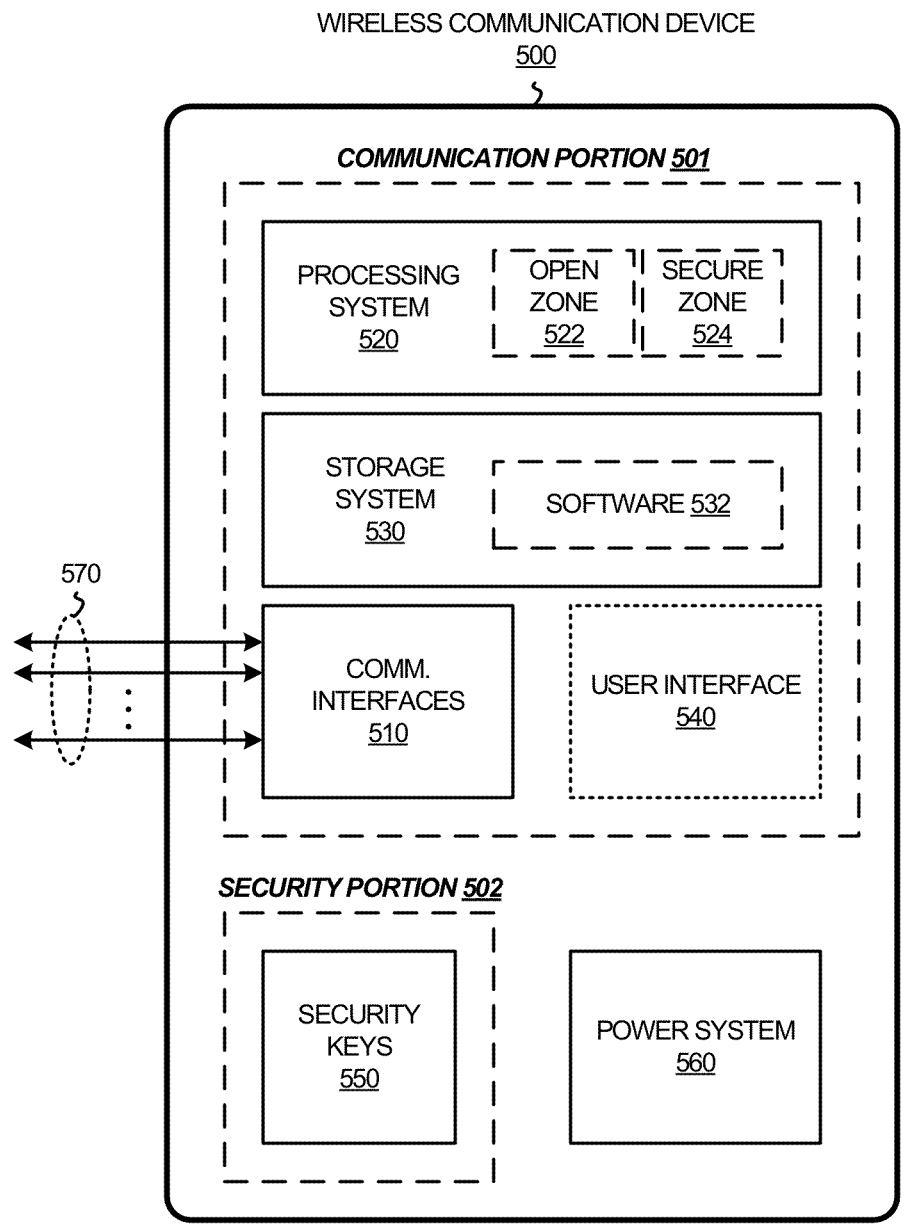
FIG. 5 is a block diagram illustrating a wireless communication device.

FIG. 5 is a block diagram illustrating wireless communication device 500, as an example of WCD 110 found in FIG. 1 or WCD 310 found in FIG. 3, although variations are possible. Wireless communication device 500 includes communication portion 501 and security portion 502. Communication portion 501 includes communication interfaces 510, processing system 520, storage system 530, optionally, user interface 540. Security portion 502 includes security keys 550. Wireless communication device 500 also includes power system 560, which can be included in any of communication portion 501 or security portion 502. It should be understood that the partitioning of the elements of wireless communication device 500 among communication portion 501 and security portion 502 can vary. Also, security portion 502 can include secure zone 524, or portions thereof.

Communication interface 510, processing system 520, storage system 530, user interface system 540, security keys 550, and power system 560 are communicatively coupled, and can communicate over associated discrete links, common busses, data links, power links, RF links, or other links. Wireless communication device 500 can be distributed or consolidated among equipment or circuitry that together forms the elements of wireless communication device 500. Wireless communication device 500 can optionally include additional devices, features, or functionality not discussed here for purposes of brevity.

Communication interface 510 comprises one or more transceiver portions and communication interface circuitry for communicating over one or more communication links 570 with one or more communication networks. In some examples, communication interface 510 includes wireless transceiver circuitry and antenna equipment for communicating with base stations of a cellular voice and data network, among other communication networks. Communication interface 510 could include transceiver equipment and antenna elements for wirelessly exchanging user communications and overhead communications over the associated ones of links 570, among further links. Portions of the transceiver circuitry, antenna elements, or other transceiver equipment can be authorized and selected based on security keys 550 as described herein. Communication interface 510 also receives command and control information and instructions from processing system 520 or user interface system 540 for controlling the operations of communications over links 570. Links 570 could each use various protocols or communication formats as described herein for links 140-142, including combinations, variations, or improvements thereof.

Processing system 520 can comprise one or more microprocessors and other circuitry that retrieves and executes software 532 from storage system 530. Processing system 520 can be implemented within a single processing device but can also be distributed across multiple processing devices or sub-systems that cooperate in executing program instructions. Examples of processing system 520 include general purpose central processing units, application specific processors, and logic devices, as well as any other type of processing device, combinations, or variations thereof.

In this example, processing system 520 includes open zone 522 and secure zone 524. Each zone of processing system 520 can be implemented in a separate microprocessor, microprocessor core, virtual core, or other hardware or software partition that separates memory spaces, operating systems, drivers, and other operational hardware and software elements so as to provide a restricted level of access for applications and users to secure zone 524, and a non-restricted level of access for open zone 522. In some examples, open zone 522 comprises a standard core of a processor system, such as for operating an Android, Windows, iOS, or other user-accessible operating system. Likewise, secure zone 524 comprises in some examples, a secure core or "trust zone" core of a processor system which prevents access to the processing and memory elements of secure zone 524 unless authorized through a security exchange or security handshake with an external authorization node.

This partitioned configuration of secure zone 524 differs from user-level password protected access, in that any application that desires to execute on secure zone 524 must first be authorized by a security handshaking process with an external authorization node. Whereas open zone 522 might run applications after a user merely "logs in" or passes a user-level security access, and the applications executed on open zone 522 are not authorized through a security handshaking process with an authorization node.

Storage system 530 can comprise any computer readable storage media or storage device readable by processing system 520 and capable of storing software 532. In some examples, portions of storage system 530 stores security keys 550. Storage system 530 can include volatile and nonvolatile, removable and non-removable media implemented in any method or technology for storage of information, such as computer readable instructions, data structures, program modules, or other data. In addition to storage media, in some implementations storage system 530 can also include communication media over which software 532 or other data can be communicated. Storage system 530 can be implemented as a single storage device but can also be implemented across multiple storage devices or sub-systems co-located or distributed relative to each other. Storage system 530 can comprise additional elements, such as a controller, capable of communicating with processing system 520. Examples of storage media include random access memory, read only memory, magnetic disks, optical disks, flash memory, virtual memory and non-virtual memory, magnetic cassettes, magnetic tape, magnetic disk storage or other magnetic storage devices, or any other medium which can be used to store the desired information and that can be accessed by an instruction execution system, as well as any combination or variation thereof, or any other type of storage media. In no case is the storage media a propagated signal.

Software 532 can be implemented in program instructions and among other functions can, when executed by wireless communication device 500 in general or processing system 520 in particular, direct wireless communication device 500 or processing system 520 to transfer an access request for delivery to a remote data system responsive to the data for transfer, receive a security challenge transferred by the remote data system, and in response, transfer a security answer for delivery to the remote data system that includes at least one hash result generated using at least one of the security keys, receive a security grant transferred by the remote data system indicating one of the hash results, select one of the transceiver portions of communication interface 510 based on an association of the transceiver portions with one of the security keys used to generate the hash result indicated in the security grant, and transfer the data for delivery to the remote data system using the selected transceiver portion, among other operations. Software 532 can include additional processes, programs, or components, such as operating system software, database software, or application software. Software 532 can also comprise firmware or some other form of machine-readable processing instructions executable by processing system 520.

In at least one implementation, the program instructions can include first program instructions that direct processing system 520 to transfer an access request for delivery to a remote data system responsive to the data for transfer, receive a security challenge transferred by the remote data system, and in response, transfer a security answer for delivery to the remote data system that includes at least one hash result generated using at least one of the security keys, receive a security grant transferred by the remote data system indicating one of the hash results, select one of the transceiver portions of communication interface 510 based on an association of the transceiver portions with one of the security keys used to generate the hash result indicated in the security grant, and transfer the data for delivery to the remote data system using the selected transceiver portion.

In general, software 532 can, when loaded into processing system 520 and executed, transform processing system 520 overall from a general-purpose computing system into a special-purpose computing system customized to transfer an access request for delivery to a remote data system responsive to the data for transfer, receive a security challenge transferred by the remote data system, and in response, transfer a security answer for delivery to the remote data system that includes at least one hash result generated using at least one of the security keys, receive a security grant transferred by the remote data system indicating one of the hash results, select one of the transceiver portions of communication interface 510 based on an association of the transceiver portions with one of the security keys used to generate the hash result indicated in the security grant, and transfer the data for delivery to the remote data system using the selected transceiver portion, among other operations. Encoding software 532 on storage system 530 can transform the physical structure of storage system 530. The specific transformation of the physical structure can depend on various factors in different implementations of this description. Examples of such factors can include, but are not limited to, the technology used to implement the storage media of storage system 530 and whether the computer-storage media are characterized as primary or secondary storage. For example, if the computer-storage media are implemented as semiconductor-based memory, software 532 can transform the physical state of the semiconductor memory when the program is encoded therein. For example, software 532 can transform the state of transistors, capacitors, or other discrete circuit elements constituting the semiconductor memory. A similar transformation can occur with respect to magnetic or optical media. Other transformations of physical media are possible without departing from the scope of the present description, with the foregoing examples provided only to facilitate this discussion.

User interface system 540 includes equipment and circuitry for receiving user input and control, such as for engaging in voice calls or data sessions, and receiving user instructions for text or video messages, among other operations. Examples of the equipment and circuitry for receiving user input and control include push buttons, touch screens, selection knobs, dials, switches, actuators, keys, keyboards, pointer devices, microphones, transducers, potentiometers, non-contact sensing circuitry, accelerometers, or other human-interface equipment. User interface system 540 also includes equipment to communicate information to a user of wireless communication device 500. Examples of the equipment to communicate information to the user could include displays, indicator lights, lamps, light-emitting diodes, haptic feedback devices, audible signal transducers, speakers, buzzers, alarms, vibration devices, or other indicator equipment, including combinations thereof.

Security keys 550 comprise one or more security keys, such as those discussed herein. These security keys are stored in a data structure of security portion 502, which can be a sub-portion of storage system 530. In some examples, a separate physical storage device or memory device is employed to store security keys 550 and make available security keys 550 to secure zone 524 and not to open zone 522. In other examples, security keys 550 are stored in a shared memory space or memory device. Security keys 550 can be hard coded during manufacture of wireless communication device 500, such as by including security keys 550 in programmable read-only memory elements.

Power system 560 includes circuitry and a power source to provide power to the elements of wireless communication device 500. The power source could include a battery, solar cell, flywheel, capacitor, thermoelectric generator, chemical power source, dynamo, or other power source. In some examples, power system 560 receives power from an external source, such as a wall outlet or power adapter. Power system 560 also includes circuitry to condition, monitor, and distribute electrical power to the elements of wireless communication device 500.

Referring back to FIG. 1, WCD 110 comprises a processing system, a plurality of transceiver portions, user interface elements, and other communication elements. The transceiver portions typically include amplifiers, filters, modulators, and signal processing circuitry. The transceiver portions can be used to communicate over ones of links 140 and 142, which can include wired, optical, or wireless links. The processing system can include one or more processing portions. WCD 110 can also include user interface systems, memory devices, non-transitory computer-readable storage mediums, software, processing circuitry, or some other communication components. WCD 110 can be a sensor device, user device, subscriber equipment, customer equipment, access terminal, wireless smartphone, computer, mobile Internet appliance, wireless network interface card, media player, game console, or some other communication apparatus, including combinations thereof.

Communication network 120 comprises communication and control systems for providing access to communication services for other devices and networks. Communication network 120 can each provide communication services including communication routing, link bridging, network communications, data exchange, or other communication services. In some examples, communication network 120 is a cellular voice and data network that can provide voice calls, text messages, data access, or other communication services provided over cellular or wireless communication networks. In some examples, communication network 120 includes equipment to provide wireless access to communication services within different coverage areas to user devices, route communications between content providers and user devices, and facilitate handoffs between equipment of different coverage areas, among other operations. Communication network 120 can also comprise elements such as radio access network (RAN) equipment, E-UTRAN Node B equipment, eNodeB equipment, Evolved Node B equipment, Mobility Management Entity (MME) equipment, interworking functions (IWF), Home Subscriber Servers (HSS), Evolved Universal Terrestrial Radio Access (E-UTRA) network equipment, base stations, base transceiver stations (BTS), base station controllers (BSC), mobile switching centers (MSC), home location registers (HLR), radio node controllers (RNC), call processing systems, authentication, authorization and accounting (AAA) equipment, access service network gateways (ASN-GW), packet data switching nodes (PDSN), home agents (HA), mobility access gateways (MAG), Internet access nodes, telephony service nodes, databases, or other communication and control equipment.

Remote data system 130 comprises computer processing systems and equipment to authorize and select transceiver portions of user devices, such as WCD 110. Remote data system 130 can include communication or network interfaces, as well as computer systems, microprocessors, circuitry, cloud-based systems, or some other processing devices or software systems, and can be distributed among multiple processing devices. Examples of remote data system 130 can also include software such as an operating system, logs, databases, utilities, drivers, networking software, and other software stored on a computer-readable medium.

Communication links 140-142 each use metal, glass, optical, air, space, or some other material as the transport media. Communication links 140-142 can each use various communication protocols, such as Time Division Multiplex (TDM), asynchronous transfer mode (ATM), Internet Protocol (IP), Ethernet, synchronous optical networking (SONET), hybrid fiber-coax (HFC), Universal Serial Bus (USB), circuit-switched, communication signaling, wireless communications, or some other communication format, including combinations, improvements, or variations thereof. Communication links 140-142 can each be a direct link or can include intermediate networks, systems, or devices, and can include a logical network link transported over multiple physical links. Communication links 140-142 can each include many different signals sharing the same associated link, as represented by the associated lines in FIG. 1, comprising resource blocks, access channels, paging channels, notification channels, forward links, reverse links, user communications, communication sessions, overhead communications, carrier frequencies, other channels, timeslots, spreading codes, transportation ports, logical transportation links, network sockets, packets, or communication directions.

In some examples, communication links 140-142 are wireless links, and use the air or space as the transport media. Wireless links 140-142 each comprises one or more wireless communication links provided over an associated wireless frequency spectrum or wireless frequency band, and can use various protocols. In this example, wireless links 140-142 can comprise Long Term Evolution (LTE), LTE Advanced, Code Division Multiple Access (CDMA), Evolution-Data Optimized (EVDO), single-carrier radio transmission technology link (1xRTT), Global System for Mobile Communication (GSM), Universal Mobile Telecommunications System (UMTS), High Speed Packet Access (HSPA), Radio Link Protocol (RLP), 3rd Generation Partnership Project (3GPP) Worldwide Interoperability for Microwave Access (WiMAX), Orthogonal Frequency-Division Multiple Access (OFDMA), Single-carrier frequency-division multiple access (SC-FDMA), Wideband Code Division Multiple Access (W-CDMA), Time Division Synchronous Code Division Multiple Access (TD-SCDMA), IEEE 802.11, Wireless Fidelity (Wi-Fi), or some other cellular or wireless communication format, including combinations, improvements, or variations thereof.

Although one main link for each of links 140-142 is shown in FIG. 1, it should be understood that links 140-142 are merely illustrative to show communication modes or access pathways for WCD 110 and remote data system 130. In other examples, further links can be shown, with portions of the further wireless links shared and used for different communication sessions or different content types, among other configurations.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A method of operating a wireless communication device comprising a security portion that stores a plurality of security keys and a communication portion comprising a plurality of transceivers for communicating over one or more wireless networks, the method comprising:

in the communication portion, transferring an access request for delivery to a remote data system responsive to data for transfer to the remote data system;

in the communication portion, receiving a security challenge transferred by the remote data system, and in response, transferring a security answer for delivery to the remote data system that includes at least one hash result generated in the security portion using at least one of the security keys;

in the communication portion, receiving a security grant transferred by the remote data system indicating one of the hash results;

in the security portion, selecting at least one of the transceivers based on an association of the transceivers with one of the security keys used to generate the hash result indicated in the security grant;

in the communication portion, transferring the data for delivery to the remote data system over a wireless network associated with the selected transceiver.

2. The method of claim 1, wherein the security challenge comprises at least a request for the at least one hash result generated using the at least one of the security keys.

3. The method of claim 1, wherein more than one hash result is transferred in the security answer, each hash result generated using a different one of the security keys.

4. The method of claim 1, wherein the remote data system selects the indicated one of the hash results based on a successful authentication of the indicated one of the hash results.

5. The method of claim 1, further comprising:

in the security portion, processing the at least one of the security keys to determine the at least one hash result generated using at least one of the security keys;

in the security portion, responsive to receiving the security grant transferred by the remote data system indicating the one of the hash results, indicating the selected one of the transceivers to the communication portion.

6. The method of claim 1, further comprising:

in the security portion, identifying the at least one of the security keys from data storage of the security portion in response to the data for transfer to the remote data system;

in the security portion, processing the at least one of the security keys to determine the at least one hash result generated using at least one of the security keys;

in the security portion, responsive to receiving the security grant transferred by the remote data system indicating the one of the hash results, selecting the at least one of the transceivers based on an association of the transceivers with the authorized one of the security keys and indicating the selected one of the transceivers to the communication portion.

7. The method of claim 1, wherein selecting the at least one of the transceivers based on the association of the transceivers with one of the security keys used to generate the hash result indicated in the security grant comprises, in the security portion, maintaining a data structure relating ones of the transceivers to ones of the security keys, and selecting the at least one of the transceivers based on the data structure.

8. The method of claim 1, wherein the plurality of transceivers for communicating over the one or more wireless networks comprise ones of Code Division Multiple Access (CDMA), Long Term Evolution (LTE), IEEE 802.11 wireless local area network (WLAN), and Global System for Mobile Communications (GSM) transceiver circuitry.

9. The method of claim 1, wherein the wireless communication device comprises a sensor portion, and wherein the data comprises sensor data, and further comprising:

in the sensor portion, monitoring at least one environmental condition to detect a trigger condition related to the environmental condition;

in the communication portion, transferring the access request for delivery to the remote data system responsive to the detection of the trigger condition and the sensor data for transfer to the remote data system.

10. The method of claim 9, wherein the environmental condition comprises at least one of a geographic location, an atmospheric condition, and a radio frequency (RF) status, and wherein the sensor portion comprises ones of a gas concentration sensor, a temperature sensor, a pressure sensor, a humidity sensor, and a seismic sensor.

11. A wireless communication device, comprising:
- a security portion comprising at least one or more non-transitory computer readable media that stores a plurality of security keys; and
- a communication portion, implemented at least partially in hardware, comprising a plurality of transceivers for communicating over one or more wireless networks;
- the communication portion configured to transfer an access request for delivery to a remote data system responsive to data for transfer to the remote data system;
- the communication portion configured to receive a security challenge transferred by the remote data system, and in response, transfer a security answer for delivery to the remote data system that includes at least one hash result generated in the security portion using at least one of the security keys;
- the communication portion configured to receive a security grant transferred by the remote data system indicating one of the hash results;
- the security portion configured to select at least one of the transceivers based on an association of the transceivers with one of the security keys used to generate the hash result indicated in the security grant; and
- the communication portion configured to transfer the data for delivery to the remote data system over a wireless network associated with the selected transceiver.

12. The wireless communication device of claim 11, wherein the security challenge comprises at least a request for the at least one hash result generated using the at least one of the security keys.

13. The wireless communication device of claim 11, wherein more than one hash result is transferred in the security answer, each hash result generated using a different one of the security keys.

14. The wireless communication device of claim 11, wherein the remote data system selects the indicated one of the hash results based on a successful authentication of the indicated one of the hash results.

15. The wireless communication device of claim 11, comprising:
- the security portion configured to process the at least one of the security keys to determine the at least one hash result generated using at least one of the security keys;
- the security portion configured to indicate the selected one of the transceivers to the communication portion responsive to receiving the security grant transferred by the remote data system indicating the one of the hash results.

16. The wireless communication device of claim 11, comprising:
- the security portion configured to identify the at least one of the security keys from data storage of the security portion in response to the data for transfer to the remote data system;
- the security portion configured to process the at least one of the security keys to determine the at least one hash result generated using at least one of the security keys;
- the security portion configured to selecting the at least one of the transceivers based on an association of the transceivers with the authorized one of the security keys responsive to receiving the security grant transferred by the remote data system indicating the one of the hash results, and indicate the selected one of the transceivers to the communication portion.

17. The wireless communication device of claim 11, comprising:
- the security portion configured to maintain a data structure relating ones of the transceivers to ones of the security keys, and select the at least one of the transceivers based on the data structure.

18. The wireless communication device of claim 11, wherein the plurality of transceivers for communicating over the one or more wireless networks comprise ones of Code Division Multiple Access (CDMA), Long Term Evolution (LTE), IEEE 802.11 wireless local area network (WLAN), and Global System for Mobile Communications (GSM) transceiver circuitry.

19. The wireless communication device of claim 11, wherein the wireless communication device further comprises a sensor portion, and wherein the data comprises sensor data, and comprising:
- the sensor portion configured to monitor at least one environmental condition to detect a trigger condition related to the environmental condition;
- the communication portion configured to transfer the access request for delivery to the remote data system responsive to the detection of the trigger condition and the sensor data for transfer to the remote data system.

20. The wireless communication device of claim 19, wherein the environmental condition comprises at least one of a geographic location, an atmospheric condition, and a radio frequency (RF) status, and wherein the sensor portion comprises ones of a gas concentration sensor, a temperature sensor, a pressure sensor, a humidity sensor, and a seismic sensor.

* * * * *